United States Patent [19]

Scalais et al.

[11] Patent Number: 5,453,923
[45] Date of Patent: Sep. 26, 1995

[54] AC CURRENT DETECTOR AND POWER SUPPLY CIRCUIT

[75] Inventors: Thierry J. E. Scalais, Grace-Hollogne; Thomas A. A. Canon, Etienne, both of Belgium

[73] Assignee: Alcatel Bell-SDT S.A., Charleroi, Belgium

[21] Appl. No.: 935,591

[22] Filed: Aug. 26, 1992

[30] Foreign Application Priority Data

Aug. 30, 1991 [EP] European Pat. Off. ............. 91870135

[51] Int. Cl.$^6$ .......................... H02M 3/315; H02H 7/12
[52] U.S. Cl. ............................... 363/56; 363/131
[58] Field of Search ................ 363/19–21, 56, 363/97, 131, 132; 323/289; 361/93, 98

[56] References Cited

U.S. PATENT DOCUMENTS

| | | | |
|---|---|---|---|
| 3,600,657 | 8/1991 | Pfaff | 318/218 |
| 4,340,931 | 7/1982 | Endo et al. | 363/44 |
| 4,717,994 | 1/1988 | Diaz et al. | 363/21 |
| 4,937,722 | 6/1990 | Deierlein | 363/49 |
| 4,969,081 | 11/1990 | Shekhawat et al. | 363/56 |

FOREIGN PATENT DOCUMENTS

| | | |
|---|---|---|
| 0339963 | 4/1989 | European Pat. Off. . |
| 0359323 | 9/1989 | European Pat. Off. . |
| 2360208 | 2/1978 | France . |

OTHER PUBLICATIONS

High-Frequency Switching Power Supplies: Theory and Design, G Chryssis, McGraw-Hill Publishing Co. 1989, pp. 144–149, 150–153, 202–203 and 220–221.

"MOSFETS Move In On Low Voltage Rectification (TA84–2)", R. Blanchard et al, *Silicon MOSpower Application Handbook*, Siliconix, Inc. 1984, Sec. 5.6, pp. 5.69–5.86.

"An Assessment of the Use of Resonant–Mode Topologies for High–Frequency Power Conversion", S. Weinbert et al, *Proceedings of the European Space Power Conference*, Madrid, Spain Oct. 2–6, 1989, pp. 331–337.

"The Design of a High Efficiency, Low Voltage Power Supply Using MOSFET Synchronous Rectification and Current Mode Control", R. Blanchard et al, *IEEE Specialists Conference Record*, 1985 pp. 355–361.

*Primary Examiner*—Peter S. Wong
*Assistant Examiner*—Adolf Berhane
*Attorney, Agent, or Firm*—Ware, Fressola, Van Der Sluys & Adolphson

[57] ABSTRACT

An full bridge Zero-Voltage-Switched DC/DC converter with the four MOSFET snitches feeding the primary winding (T1) of the output transformer (T1) through a series inductance (L) and a series DC blocking capacitance (C) uses two MOSFET asynchronous rectifiers ((Q2) in its full wave output section. Each ((Q2) is serially connected between the output transformer (T1) and the output shunt capacitance (C') through the primary winding (T21) of a transformer detecting its drain current. The secondary winding (T22) of the detector transformer is shunted by a pair of resistances (R1/R'1) each in series with the base-emitter junction of a bipolar transistor (Q1/Q'1), the two transistors of complementary polarity forming a totem-pole branched across an auxiliary winding (T12) of the output transformer. The totem-pole output coupled (R2) to the gate of the MOSFET (Q2) switches its state upon the drain current value crossing the adjustable (R1/R'1) low value of the detector transformer magnetising current.

20 Claims, 1 Drawing Sheet

AC CURRENT DETECTOR AND POWER SUPPLY CIRCUIT

TECHNICAL FIELD

The invention relates to an AC current detector in which the current level is detected from the secondary winding of a transformer loaded with an asymmetrically conducting impedance and with the current flowing through the primary winding.

BACKGROUND OF THE INVENTION

Current step-down transformers with the primary winding connected in series with the load circuit, the current in which is to be measured, are an old measuring technique, particularly for ammeters and wattmeters connected across the secondary winding, but have also been used in more modern sense schemes for electronic applications. The circuit defined above is for instance known from "High-Frequency Switching Power Supplies: Theory and Design", G. Chryssis, McGraw-Hill Publishing Company, 1989, particularly p. 203 and 221. In the first, isolated current sensing has the secondary winding shunted by a diode in series with a resistance, the latter shunted on the input of a differential amplifier part of a power supply control circuit. In the second, the diode and resistance series combination part of a transistorized detector is again across the secondary with the primary winding of the current step-down transformer monitoring the load current of a power supply.

Such known techniques are however not suitable as such when energy consumption is at a premium and a fast reacting detector is needed as is the case for instance in recent high frequency electronic power supply circuits using power MOS transistors (MOSFETs) in integrated circuits. Using MOSFETs for the switches of such DC/DC converters but Schottky diodes for the output rectifiers has in recent years lost ground to the latter relying also on MOSFETs as synchronous rectifiers. Indeed, conduction losses in the rectifier unit of the converter can in this way be reduced substantially. Even though such losses are only a relatively low percentage of the output power, they represent an important fraction of the total converter losses and in many electronic applications maximum efficiency is very much in demand. Representative figures readily illustrate the comparison between a Schottky diode and a MOSFET as output rectifier when considering a 0.5 volt drop for the first and an ON resistance of 15 milliohms for the second. With a mean output current of 3 amperes for the converter, the conducting diode thus dissipates 1.5 watt while the MOSFET conduction loss will only be 0.185 watt widen assuming a form factor leading to an RMS (Root Mean Square) value of 3.5 amperes. Even though 1.5 watt is only 2.5% of the converter output power, if the output voltage is 20 volts it can constitute approximately 30% of the total converter losses. Thus, the very substantial conduction loss reduction afforded by MOSFETs as output recitifiers can be an attractive solution for many applications.

Representative considerations on such MOSFET use have been given by R. Blanchard and R. Severns in Section 5.6 on p. 5–69 to 5–86 of the "Mospower applications handbook", Siliconix Inc., 1984, i.e. MOSFETs move in on low voltage rectification (Siliconix Technical Article TA 84-2). Therein two main gate drive circuits for the MOSFET output rectifiers are discussed, i.e. based on use of auxiliary windings on the DC/DC converter output transformer secondary or independent gate drive circuits with proper timing, the latter dependent on the type of converter circuit. Additional considerations on such output MOSFET rectifier gate drive are also to be found for instance in the IEEE Power Electronics Specialists Conference Record, 1985, p. 355 to 361, "The design of a high efficiency, low voltage power supply using MOSFET synchronous rectification and current mode control", by R. Blanchard and P. E. Thibodeau. In particular, the importance of the form factor of the converter output current is noted since different timing methods for gate-drive signals can lead to substantial differences in the RMS current as compared to the average, i.e. a 6% instead of 6.5% increase, which, as noted above, affects the MOSFET output rectifier efficiency far more than the Schottky diode.

In the above 1984 handbook it is pointed out that the additional complexities of using an independent gate drive are to be viewed in the light of various advantages some of which linked to the converter design or topology. In "An assessment of the use of resonant-mode topologies for high frequency power conversion", P. 331 to 337 of the Proceedings of the European Space Power Conference, Madrid, Oct. 2–6, 1989, S. H. Weinberg and C. D. Manning include ZVS (Zero-Voltage-Switched topologies) such as the Class-E resonant converter which is one of the circuits using an inductance and a capacitance both in series with the output transformer primary winding. While this is a single-ended DC/DC converter using only one MOSFET switch, the series circuit can also be fed through a full bridge using four switches. With each pair of diagonally opposite MOSFETs simultaneously turned on during their respective half-cycle when the voltage across them is close to zero, the reversal of the DC voltage applied to the series circuit including the primary winding takes place at a time of the half-cycle corresponding to a peak current value.

Unfortunately, as already noted in the above 1984 article in connection with the use of auxiliary transformer windings for the gate drive, not all circuit topologies are adapted to the desired way of controlling MOSFETs acting as output rectifiers, e.g. the quasi-square wave converter using a series output coil contrary to the buck or boost-derived converters, or the above full bridge ZVS converter, all three without a series inductance immediately preceding the output shunt capacitance.

When neither a clock synchronised command of the MOSFET output rectifiers nor the use of auxiliary transformer windings are suitable options for the MOSFET gate drive, as is the case for instance for the above full bridge ZVS converter, a suitable AC current detector would be desirable. Indeed, ideally, a rectifying MOSFET should be turned on as a positive current would tend to appear therein, turning off occurring when it would tend to become negative.

DISCLOSURE OF INVENTION

An object of this invention is therefore an AC current detector using a transformer and which has a fast response compatible with high frequency electronic power supplies while consuming little power.

Another object of the invention is a MOSFET output rectifier controlled through its main output drain current so as to enable its inclusion between a poster supply circuit using MOSFET switches and an output shunt capacitance, without a series inductance necessarily preceding the latter, such as a full bridge ZVS (Zero-Voltage-Switched) DC/DC converter.

In accordance with a feature of the invention, two asymmetrically conducting impedances and poled in opposite directions are branched in parallel on the secondary winding and detecting means are provided to sense which of the two impedances is conductive.

Such an AC current detector can provide predetermined positive and negative secondary voltage levels depending on whether the primary current is above or below the transformer magnetising current. The latter will exhibit only slight linear increases and decreases if the transformer magnetising inductance is sufficiently large and its average level can be adjusted as a function of the respective resistive values of the two impedances. Thus, depending also on the waveform of the measured AC current one can control the fraction of the period of this current during which the secondary voltage is at one of the two predetermined levels. Switch-over between the two can be as fast as the transition time of the diodes and a relatively small transformer consuming a limited amount of energy can be used.

The invention also relates to a power supply circuit with an output transformer feeding one or more MOSFET output rectifiers each serially associated with the input port of an individual AC current detector whose output port is coupled between the gate and source terminals of the MOSFET.

Such a power supply circuit is disclosed for instance on p. 150 to 152 of the above Chryssis textbook. This current-driven output rectifier circuit relies on a current detector transducer using a 3-winding saturable core transformer associated with a transistor. The transformer is driven by the source current and a 25/1 current step-down ratio is provided for the gate current winding shunted by the collector-emitter path of a bipolar transistor with a 3/1 current step-down ratio for the base current winding.

Apart from a third winding being needed, such a saturable core transformer not only dissipates additional energy but operation tolerance depends on the level of saturation.

A further object of the invention is therefore a power supply circuit in which the AC current detectors associated with the MOSFET output rectifers avoid such drawbacks.

In accordance with a further feature of the invention, the input port is fed by the drain current of the associated rectifier and the detector is powered by a winding of the output transformer.

In this manner, particularly using the detector of the present invention, even with such power supply circuits as the above full bridge ZVC, maximum savings on the output MOSFET rectifier conduction losses can be secured. With two such rectifiers coupled between respective outer ends of the centre-tapped output transformer on the one hand and the live end of the output capacitance on the other, the primary winding of a detector transformer can couple the drain of the MOSFET to the output capacitance and this for each of the rectifiers. Two auxiliary windings on the output transformer secondary can now be used in order that a totem-pole be branched on each of them with the secondary winding of the detector transformer coupled on the one hand to the PNP and NPN transistors commoned emitters, the latter resistively coupled to the MOSFET gate, and on the other hand to their base resistances. In this way, the body diode of the MOSFET is only briefly turned on as the current into the MOSFET source crosses the set magnetising current level in either direction. Thereby, nominal conduction losses are achieved without relying on synchronous rectifier action, the auxiliary windings now merely supplying predetermined bias potentials to the MOSFET gates to turn the rectifiers on or off.

To be noted that it is known to have two coupled windings, the first in the series path leading to the output capacitance of a forward converter and the second resistively coupled to the gate-source terminals of a MOSFET rectifier whose drain is connected to the first winding away from the capacitance, e.g. p. 146/7 of the above Chryssis textbook, However, in a forward converter, this rectifier is the flywheel diode and the first winding is thus an energy storing coil to deliver it to the load (capacitance) when this shunt MOSFET rectifier is turned on with the help of the second winding. Thus, one does not have a transformer with a mere DC isolation function and neither a winding solely passing the controlled MOSFET drain current since this forward converter series coil receives also the drain current from the series MOSFET rectifier having its gate-source coupled to an auxiliary winding of the output transformer.

The above mentioned and other objects and features of the invention will become more apparent and the invention itself will be best understood by referring to the following description of an embodiment taken in conjunction with the accompanying drawing:

BEST MODE FOR CARRYING OUT THE INVENTION

Figure 1:
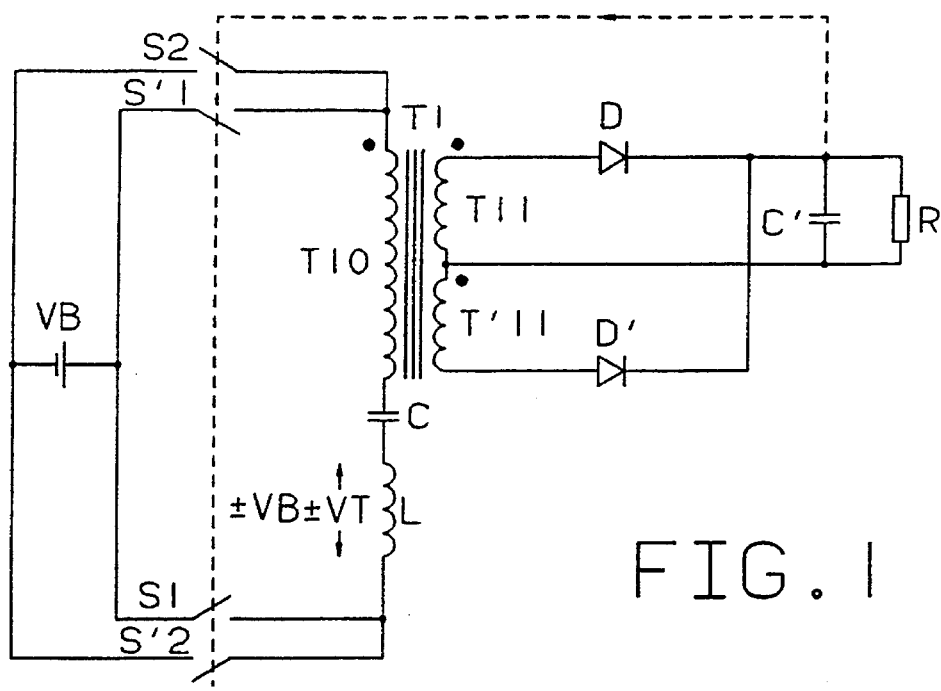
FIG. 1, a full bridge Zero-Voltage-Switched (ZVS) DC/DC converter.

The full bridge ZVS DC/DC converter of FIG. 1 has the input DC voltage VB feeding a primary winding T10 of an isolating transformer TI through a series circuit including also a power inductor L and a DC blocking capacitor C, the frequency of operation being well above the resonant LC frequency. This occurs alternately through simultaneous closure of the shown open switches S1 and S2, actually constituted by power MOSFETs poled in the same direction, or S'1 and S'2 for the reverse current direction through T10 during the other half-cycle of the periodic operations. These are controlled in classical manner by a regulation loop (not shown but with the control of the switches symbolically indicated by the interrupted line linking them to C') from the DC output, i.e. the voltage appearing on a load R shunted by an output capacitance C' whose live terminal is connected to the outer ends of the push-pull secondary windings T11 and T'11 of T1 through the shown diodes D and D' respectively. The other commoned end of C'and R is connected to the commoned ends of T11 and T'11 thus constituting the reference output terminal of the converter. The control law of the regulation loop is arranged to turn off the currently conducting pair of MOSFETS switches, e.g. S1 and S2, prior to the absolute positive or negative value of the current through T10 reaching its peak value.

Considering for instance the half-cycle during which S1 and S2 are closed, S'1 and S'2 being open as shown, starting with a current through T10 crossing zero and becoming positive, it will increase linearly, a substantially constant voltage VB-VT appearing across L, with VT being the voltage across T10 as reflected from the transformer secondary.

At a time determined by the control law of the regulation loop (not shown), S1 and S2 are then turned off starting a gap stage during which all four switches are open, i.e. thus turned off. During that time interval, the potentials at the ends of the series circuit involving T10, C and L will be exchanged following the charge of the parasitic capacitances of S1 and S'1 by the energy stored in L while the capacitances of S2 and S'2 previously charged at VB are discharged. After this potential exchange, zero voltage is found across S'1 and S'2 following the clamping action of the intrinsic body diodes of these power MOSFETs.

During this exchange of potentials the positive current through the series circuit T10, C and L will no longer increase linearly but the slope of the increase will gradually diminish to zero to reach a current peak whereafter it will decrease with a gradually increasing negative slope.

Next, follows a free wheeling stage during which this positive current will now decrease linearly at a steeper rate than for the linear increase since the voltage across L is now −VB−VT, instead of VB−VT. After the exchange of potentials, the decreasing current initially flows through the body diodes of S'1 and S'2 until these MOSFET switches are turned on whereafter it flows through the actual switches thereby reducing resistive switching losses. Zero-Voltage-Switching is thus achieved since at turn-on the voltage across S'1 or S'2 is the forward voltage of their body diode which is close to zero.

The linear decrease of the above positive transformer current continues until it reaches zero and becomes negative. Thereafter, in the following half-cycle of operations, it will increase linearly in negative value, at the same rate of increase as for the positive current since the voltage across L is now −VB+VT, the opposite states of conductivity for the output rectifying diodes D and D' being exchanged. This negative current waveform will be matched to the positive one, i.e. VB+VT being the next condition across L, thus completing a full cycle.

Figure 2:
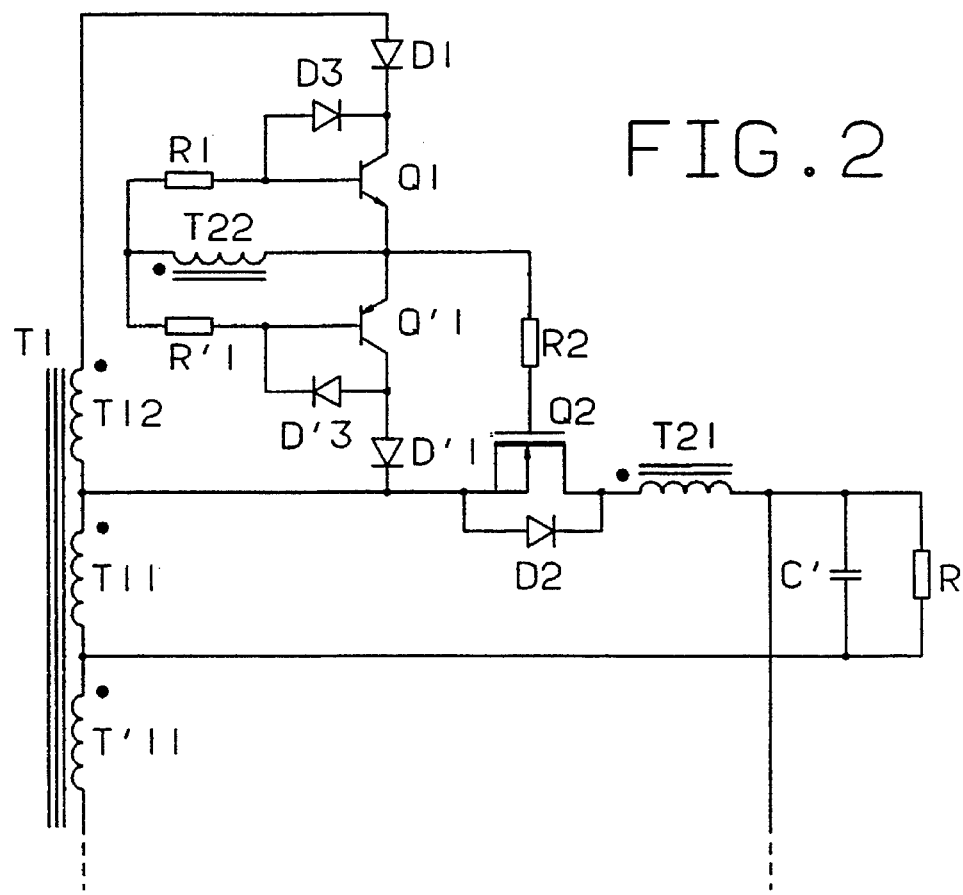
FIG. 2, an asynchronous output MOSFET rectifier gate drive using a fast current detector, both in accordance with the invention and incorporated in the ZVS converter of FIG. 1.

When power MOSFETs are also used for D and D', instead of Schottky diodes, FIG. 2 shows how a current detector can ensure maximum reduction of conduction losses by controlling them in an asynchronous manner, relying solely on their drain current to control their gate-to-source voltage. The circuits for D and D' being identical only that for D is shown in FIG. 2 which reproduces therefore only part of FIG. 1, i.e. windings T11 and T'11 with only the circuitry coupling T11 to C', R since that from T'11 is identical.

Instead of D linking T11 to C', R in FIG. 1 one now has a circuit powered from the additional auxiliary winding T12 of T1, poled as shown, and including a fast current level detector whose main elements are a transformer T2 with its windings T21 and T22 positioned separately and poled as shown in association with a totem-pole made up of NPN transistor Q1 and PNP transistor Q'1.

Power MOSFET Q2 is now shown to have taken the place of D with its source connected to the junction of T11 and T12 while its drain is coupled to C', R through the primary winding T21 of T2. This is coupled to the secondary winding T22 which is symmetrically coupled to the totem-pole incuding two identical half-topologies with paired elements distinguished by a prime notation. Thus, T22 is shunted by base resistance R1 and the base-emitter diode of Q1 whose collector is coupled to the outer end of T12 through diode D1 poled as shown and protecting the bipolar transistor base-emitter junction while a like shunt involves R'1, Q'1 and D'1. As shown the latter cathode is connected to the source of Q2 so that D1, Q1, Q'1 and D'1 are thus all poled in the same direction across T12. The gate of Q2 is coupled to the commoned emitters of Q1/Q'1 through resistance R2. A further diode D2 is shown between the source and drain of Q2 but may actually be constituted by its body diode. To reduce the propagation delay due to the storage time of the transistors, two anti-saturation diodes D3/D'3 poled as shown are positioned across the base-collector junctions of Q1/Q'1 respectively. All diodes shown may be of the Schottky type.

Contrary to a centre-tapped full wave DC/DC converter output section using power MOSFETs as synchronous rectifiers, e.g. p. 145/6 of the above Chryssis textbook, such an output transformer auxiliary winding as T12 thus only serves to power the Q1/Q'1 totem-pole controlling MOSFET Q2 through the sensing transformer windings T21 and T22.

With a linearly increasing positive current starting from zero making D2 conductive, the increasing current through T21 will quickly overtake the slowly increasing magnetising current of detector transformer T2 thereby leading its secondary winding T22, poled as shown, to render Q1 conductive instead of Q'1 as previously. Thus, the Q1/Q'1 totem-pole which is not referenced to the current measuring point provides the amplification necessary for using the T22 signal to ensure fast turn-on of Q2 by supplying an appropriate potential level through D1, Q1 and via R2. Fast switching is ensured by D3 and the dissipated detector power is linked to that needed to switch the base-emitter diode of Q1/Q'1 and maintain one of the two conductive. A very small series voltage will appear across T21 since it will be equal to the small potential across T22 divided by the turns ratio from T22 to T21, e.g. 50 to 1, this corresponding to the step-down current ratio from the load circuit (T21) to the detector (T22), i.e. in the opposite direction. Upon Q2 becoming conductive with a voltage drop smaller than the forward one of D2, this last turns off.

When there is a subsequent linear decrease of the current, a reverse totem-pole action takes place upon the current falling below the magnetising one for T2, i.e. Q'1 becomes again conductive instead of Q1 thereby discharging the gate-source capacitance of Q2 through R2, Q'1 and D'1.

Since the magnetising current of T2 is such that the average of the positive voltage across T22 cancels the negative one in function of the known voltage waveform, the values of R1/R'1 can be chosen to adjust the magnetising current level just high enough to turn off Q2 as desired when the current becomes negative. In this way, the second turn-on of D2 when Q2 is turned off can be limited or avoided altogether to reduce conductive losses.

Thus, the above AC current detector is particularly attractive for the control of a MOSFET output rectifier since in addition to fast operation and low power consumption, DC isolation from the detector is ensured for the output rectifier current which is not affected by the detector.

While the principles of the invention have been described above in connection with specific apparatus, it is to be clearly understood that this description is made only by way of example and not as a limitation on the scope of the invention.

We claim:

1. An AC current detector in which a current level is detected from a secondary winding (T22) of a transformer loaded with an asymmetrically conducting impedance (R1, Q1/R'1, Q'1) and with a current flowing through a primary winding (T21), characterized in that two asymmetrically conducting impedances (R1, Q1/R'1, Q'1) are poled in opposite directions and connected in parallel across said secondary winding (T22)

detecting means (T21, Q1/Q'1) is provided to sense which of the two asymmetrically conducting impedances (R1, Q1/R'1, Q'1) is conductive;

each impedance is constituted by a resistance (R1/R'1) in series with an emitter-base junction of a bipolar transistor (Q1/Q'1), the two bipolar transistors (Q1/Q'1) have complementary polarity forming a totem-pole fed by a voltage supply (T12) of an output transformer (T1) and producing an output signal at common emitters of the two bipolar transistors (Q1/Q'1); and protecting diodes (D1/D'1) couple collectors of said two bipolar transistors (Q1/Q'1) to said voltage supply (T12).

2. An AC current detector in which a current level is detected from a secondary winding (T22) of a transformer loaded with an asymmetrically conducting impedance (R1, Q1/R'1, Q'1) and with a current flowing through a primary winding (T21), characterized in that two asymmetrically conducting impedances (R1, Q1/R'1, Q'1) are poled in opposite directions and connected in parallel across said secondary winding (T22);

detecting means (T21, Q1/Q'1) is provided to sense which of the two asymmetrically conducting impedances (R1, Q1/R'1, Q'1) is conductive;

each impedance is constituted by a resistance (R1/R'1) in series with an emitter-base junction of a bipolar transistor (Q1/Q'1), the two bipolar transistors (Q1/Q'1) have complementary polarity forming a totem-pole fed by a voltage supply (T12) of an output transformer (T1) and producing an output signal at common emitters of the two bipolar transistors (Q1/Q'1); and anti-saturation diodes (D3/D'3) are positioned across base-collector junctions of said two bipolar transistors (Q1/Q'1).

3. An AC current detector in which a current level is detected from a secondary winding (T22) of a transformer loaded with an asymmetrically conducting impedance (R1, Q1/R'1, Q'1) and with a current flowing through a primary winding (T21), characterized in that two asymmetrically conducting impedances (R1, Q1/R'1, Q'1) are poled in opposite directions and connected in parallel across said secondary winding (T22);

detecting means (T21, Q1/Q'1) is provided to sense which of the two asymmetrically conducting impedances (R1, Q1/R'1, Q'1) is conductive;

each impedance in constituted by a resistance (R1/R'1) in series with an emitter-base junction of a bipolar transistor (Q1/Q'1), the two bipolar transistors (Q1/Q'1) have complementary polarity forming a totem-pole fed by a voltage supply winding (T12) of an output transformer (T1) and producing an output signal at common emitters of the two bipolar transistors (Q1/Q'1);

the AC current detector is in a power supply circuit; and the potential across the voltage supply winding (T12) of the output transformer (T1) constituting the totem-pole voltage supply is coupled to an output of a MOSFET output rectifier which becomes conductive when the drain current exceeds a magnetizing current of a detector transformer (T21).

4. Power supply circuit as in claim 3, characterized in that the output rectifier (Q2) in series with the input port (T21) is directly connected between the output transformer and an output shunt capacitance (C').

5. Power supply as in claim 4, characterized by an inductance (L) in series with an input winding of the output transformer (T1).

6. Power supply circuit as in claim 3, characterized by a DC blocking capacitance (C) in series with the inductance (L).

7. Power supply circuit as in claim 6, characterized in that the power supply circuit is a full bridge Zero-Voltage-Switched DC/DC converter with four MOSFET switches (S1, S2, S'1, S'2).

8. Power supply circuit having an output transformer T1 feeding one or more MOSFET output rectifiers (Q2) each serially associated with an input of an individual AC current detector with an output coupled between gate and source electrodes of the one or more MOSFET output rectifiers (Q2), characterized in that the individual AC current detector includes a current detector having detector transformer means (T21, T22) with a primary winding (T21);

the individual AC current detector is powered by a winding (T12) of the output transformer (T1);

the input of the individual AC current detector is fed by a drain current of an associated one of the MOSFET output rectifiers (Q2);

the potential across a voltage supply winding (T12) of the output transformer (T1) constituting a totem-pole voltage supply is coupled to an output of a MOSFET output rectifier which becomes conductive when drain current exceeds a magnetizing current of the primary winding (T21); and said output transformer (T1) feeds two MOSFET output rectifiers, a first one of said two MOSFET output rectifiers being connected between one end of said output transformer (T1) and a first terminal of an output shunt capacitance (C') and a second one of said two MOSFET output rectifiers is connected between a second end of said output transformer and said first terminal of said output shunt capacitance (C').

9. An AC current detector for sensing current flow to control a controlled device connected thereto, comprising:

detector transformer means having a primary detector winding (T21) and a secondary detector winding (T22);

two asymmetrically conducting impedance means (Q1, R1, Q'1, R'1) connected in parallel across said secondary detector winding (T22) and poled in opposite directions;

said primary detector winding (T21) for sensing current flow through said two asymmetrically conducting impedance means (Q1, Q'1) and providing a current detector control signal to control the controlled device.

10. An AC current detector according to claim 9, wherein said AC current detector includes two series coupled transistors of complementary conductivity type (Q1, Q'1) having emitter-base junctions connected in series with a respective one of two resistances (R1, R'1), the series connections constituting respective ones of said two asymmetrically conducting impedance means (Q1, R1, Q'1, R'1) and said two transistors of complementary conductivity type (Q1, Q'1) being fed by a voltage supply (T12) and producing at their common emitters an output signal to control said control device.

11. An AC current detector according to claim 9, wherein the number of turns of the secondary detector winding (T22) is at least one order of magnitude, e.g. 50 times, larger than the number of turns for the primary detector winding (T21).

12. An AC current detector according to claim 10, wherein said AC current detector includes protecting diodes (D1/D'1) that couple collectors of the two transistors of complementary conductivity type (Q1, Q'1) to the voltage supply (T12).

13. An AC current detector according to claim 10, wherein said AC current detector includes anti-saturation diodes (D3/D'3) connected across base-collector junctions of the two transistors of complementary conductivity type (Q1, Q'1).

14. An AC current detector according to claim 10, wherein said voltage supply (T12) is connected across a power winding (T12) of an output transformer (T1) which forms part of a power supply circuit and feeds at least one MOSFET output rectifier (Q2) constituting said controlled device, said primary detector winding (T21) being connected in series with said at least one MOSFET output rectifier (Q2) and fed by drain current thereof and said AC current detector having an output coupled between gate and source terminals of said at least one MOSFET output rectifier (Q2).

15. An AC current detector according to claim 14, wherein said at least one MOSFET output rectifier (Q2) has a body diode between source and drain terminals being made temporarily conductive prior to a change of state of said at least one MOSFET output rectifier (Q2).

16. An AC current detector according to claim 14 wherein said at least one MOSFET output rectifier (Q2) has a diode (D2) between source and drain terminals being made temporarily conductive prior to a change of state of said at least one MOSFET output rectifier (Q2).

17. An AC detector according to claim 10, wherein said voltage supply (T12) is coupled to the output to make said at least one MOSFET output rectifier (Q2) conductive when drain current exceeds the magnetizing current of the said primary detector winding (T21).

18. An AC current detector according to claim 17, wherein said at least one MOSFET output rectifier (Q2) is directly connected between an output transformer (T1) and an output shunt capacitance (C').

19. An AC current detector according to claim 18, wherein said AC current detector includes an inductance (L) in series with an input winding of the output transformer (T1).

20. An AC current detector according to claim 19, wherein said AC current detector includes a DC blocking capacitance (C) in series with the inductance (L).

* * * * *